(No Model.)
W. WOOLCOTT.
KNEADING MACHINE.
No. 490,182. Patented Jan. 17, 1893.
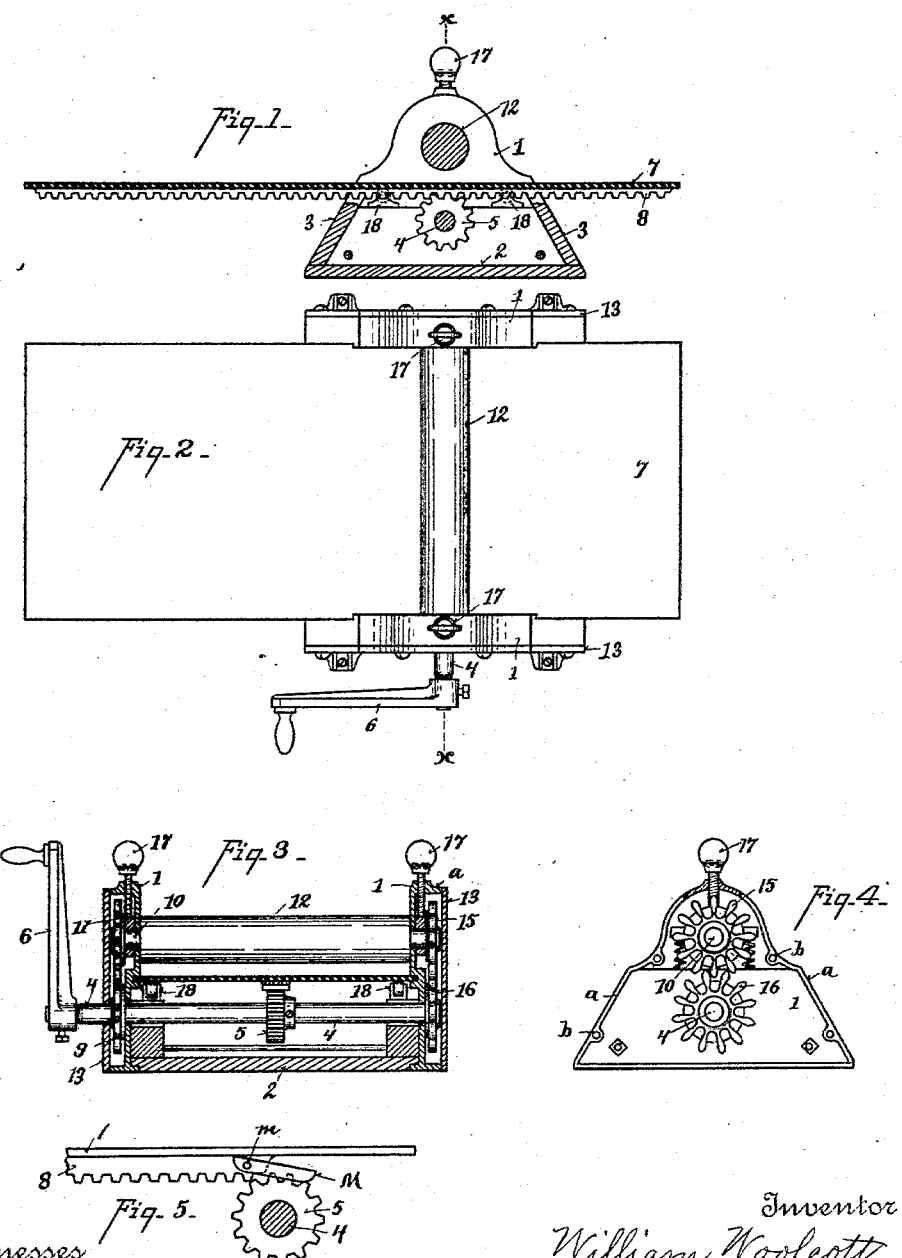

UNITED STATES PATENT OFFICE.

WILLIAM WOOLCOTT, OF WINCHESTER, KENTUCKY.

KNEADING-MACHINE.

SPECIFICATION forming part of Letters Patent No. 490,182, dated January 17, 1893.

Application filed September 29, 1892. Serial No. 447,269. (No model.)

*To all whom it may concern:*

Be it known that I, WILLIAM WOOLCOTT, a citizen of the United States, residing at Winchester, in the county of Clark and State of Kentucky, have invented certain new and useful Improvements in Kneading-Machines, of which the following is a specification.

My invention relates to a dough kneading machine.

The object of my invention is to provide a new and improved machine which can be cheaply made and readily manipulated to rapidly knead dough to any desired consistency.

The various features of my invention are fully set forth in the description and hereinafter claimed, reference being made to the accompanying drawings making a part of this specification, in which—

Figure 1 is a longitudinal central vertical section of my improvement. Fig. 2 is a top plan view. Fig. 3 is a section on line $x, x$, Figs. 1 and 2. Fig. 4 is an end elevation with the housing plate removed. Fig. 5 is a detail modification.

The frame of the machine is composed of end pieces 1, a base piece 2 and inclined side pieces 3. A shaft 4 journaled in the end pieces 1, and located beneath a reciprocating kneading table 7, is provided with a center pinion 5 and end pinions 9 and 16 meshing into pinions 11 and 13 secured to the ends of the shaft 10 of a kneading roller 12 which is located above the kneading table 7. The under side of the table is provided with a rack 8 with which the pinion 5 engages, so that by operating a crank handle 6 on the shaft 4, the table can be moved back and forth and at the same time a rotary motion is imparted to the kneading roller. The end pieces 1 are provided with flanges $a$ to which are fitted cover plates 13 held in place by screws engaging the threaded holes $b$, for the purpose of housing in or inclosing the pinions 9, 11, 15 and 16. By housing in the pinions the oil for oiling the journals is kept therein, and prevented from getting out upon the table. The roller 12 abuts against the insides of the end-pieces and prevents the oil from working outward on to the kneading table. The journals for the pinions 11 and 13 are set in a movable journal box and are suspended by screws 17; the teeth of the pinions 9, 11, 15, 16, are long as shown in Fig. 4, so as to allow a great range of adjustment. By this means the kneading roller 12 can be adjusted to or from the table 7 to regulate the amount of pressure applied to the dough. The teeth of the pinions are long enough for the range of adjustment. 18 represents friction rollers on which the table 7 is mounted. The said table is gained into the sides of the frame piece 1, as shown in Fig. 3.

Mode of operation: When the crank 6 is turned shaft 4 is driven, the pinion 5 moving the table longitudinally and the pinions 9 and 16 transmit motion to the roller 12, which revolves in the same direction that the table 7 moves; the dough is placed upon the table and carried between the roller 12 and the table and rolled or kneaded. When the dough has been carried through the motion of the crank 6 is reversed, the dough turned on the table and passed again between the kneading roller and kneading table. This is continued until the dough is thoroughly kneaded.

In the modification shown in Fig. 5, M represents a link or stirrup hinged at $m$ to the end of the rack. The object of this link is to enable the rack to be automatically brought into engagement with the pinion 5 on reversing the movement of the shaft 4 after the rack has been passed out of engagement with the pinion. The link rests upon and slides over the teeth of the pinion until its movement is reversed when it engages the teeth and draws the rack forward into engagement with the pinion. One of these links, M, is placed at each end of the rack.

By my construction and arrangement the rack and pinion by which the table is reciprocated, and the pinions by which the kneading roller is rotated are entirely shielded from contact with the dough being kneaded, and the shaft of the kneading roller is susceptible of adjustment toward and from the upper surface of the kneading table.

Having described my invention what I claim is—

The combination with a frame, a shaft journaled in the frame and provided with a pinion, and a reciprocating table having a rack engaging the said pinion, of a stirrup pivoted to the end of the rack and adapted to engage with the teeth of the said pinion, and a kneading roller journaled in the frame above the table and geared to the pinion-carrying-shaft, substantially as described.

In testimony whereof I have hereunto set my hand.

WILLIAM WOOLCOTT.

Witnesses:
T. SIMMONS,
C. W. MILES.